E. V. LAWRENCE.
VEHICLE SAFETY BRAKE MECHANISM.
APPLICATION FILED JULY 13, 1916.

1,271,916.

Patented July 9, 1918.
4 SHEETS—SHEET 1.

Fig.1

Inventor
Edward V. Lawrence
By his Attorney

E. V. LAWRENCE.
VEHICLE SAFETY BRAKE MECHANISM.
APPLICATION FILED JULY 13, 1916.

1,271,916.

Patented July 9, 1918.
4 SHEETS—SHEET 3.

Inventor
Edward V. Lawrence
By his Attorney

E. V. LAWRENCE.
VEHICLE SAFETY BRAKE MECHANISM.
APPLICATION FILED JULY 13, 1916.

1,271,916.

Patented July 9, 1918.
4 SHEETS—SHEET 4.

Inventor
Edward V. Lawrence
By his Attorney

UNITED STATES PATENT OFFICE.

EDWARD V. LAWRENCE, OF NEW YORK, N. Y.

VEHICLE SAFETY BRAKE MECHANISM.

1,271,916.  Specification of Letters Patent.  Patented July 9, 1918.

Continuation of application Serial No. 9,504, filed February 20, 1915. This application filed July 13, 1916. Serial No. 109,003.

*To all whom it may concern:*

Be it known that I, EDWARD V. LAWRENCE, a citizen of the United States of America, and a resident of New York, county and State of New York, have invented certain new and useful Improvements in Vehicle Safety Brake Mechanism, of which the following is a specification, reference being had to the accompanying drawings, forming a part thereof.

My invention relates to brakes for vehicles, such as trucks, wagons, carts, trailers, etc., and has special reference to brakes of the general character set forth in Patent No. 983,294 granted February 7, 1911, to John N. Lawrence, which are automatically set when the vehicle is pushing against the horses, as in going down hill or when a sudden stop is being made.

One object of my invention is to provide an improved brake mechanism of the aforesaid character that shall be simple and durable in construction and particularly reliable in operation.

Another object is to provide a brake mechanism that shall be adapted for application, not only to a horsedrawn vehicle, but also to a trailer drawn by a tractor or the load-carrying section of a semi-trailer.

Another object is to provide a band brake mechanism constituting a distinct article of manufacture and adapted to be attached to vehicles of varying sizes and styles.

Still another object is to provide for the automatic release of the brake when the vehicle is propelled in a reverse direction as for example, by the backing of the team or tractor.

Another object is to provide independent means which may be within the control of the driver, for setting the brakes in case of emergency in going up hill, or to rest the horses of the horse-drawn vehicle, Another object is to provide a brake drum and band that is adapted under normal conditions to wrap about the drum so as to tighten when the drum turns forwardly, but is also provided with means for adjusting the parts to cause the band to tighten about the drum when the drum turns backwardly.

Another object is to provide a vehicle brake that shall embody a lost motion connection sufficient to permit a material rotative movement of the vehicle wheels in the opposite direction after the brake is set in one direction of wheel rotation, whereby the load may be started on a hill, for example, before the brakes are released, without subjecting the team or tractor to an additional burden or overload.

Other objects and advantages of my invention, including various improved structural details of importance, will be set forth hereinafter, and in order that my invention may be thoroughly understood I will now proceed to describe the same in the following specification and then point out the novel features thereof in appended claims.

Referring to the drawings,

Fig. 2 is a plan view of the running gear and tongue of the wagon of Fig. 1.

A portion of the brake mechanism is shown on a larger scale in Fig. 3, which is a sectional plan view corresponding to Fig. 2.

Figs. 4 and 5 are sectional elevations of the brake mechanism, taken respectively on the lines 4—4 and 5—5 of Fig. 6 which is a front elevation of the brake mechanism.

One of the details of the mechanism is shown in Fig. 7.

Fig. 12 shows the adaptation of the brake mechanism for use on a trailer which is drawn by a motor tractor or the like.

Having special reference to Figs. 1 to 7 inclusive of the drawings,—10 represents the axle of a wagon or vehicle of which 11 indicates the wheels and 12 the tongue. Secured to the axle 10 near its respective ends and between the wheels of the vehicle, is a pair of clamps 14, to which links 15 are pivotally connected.

Figure 1:
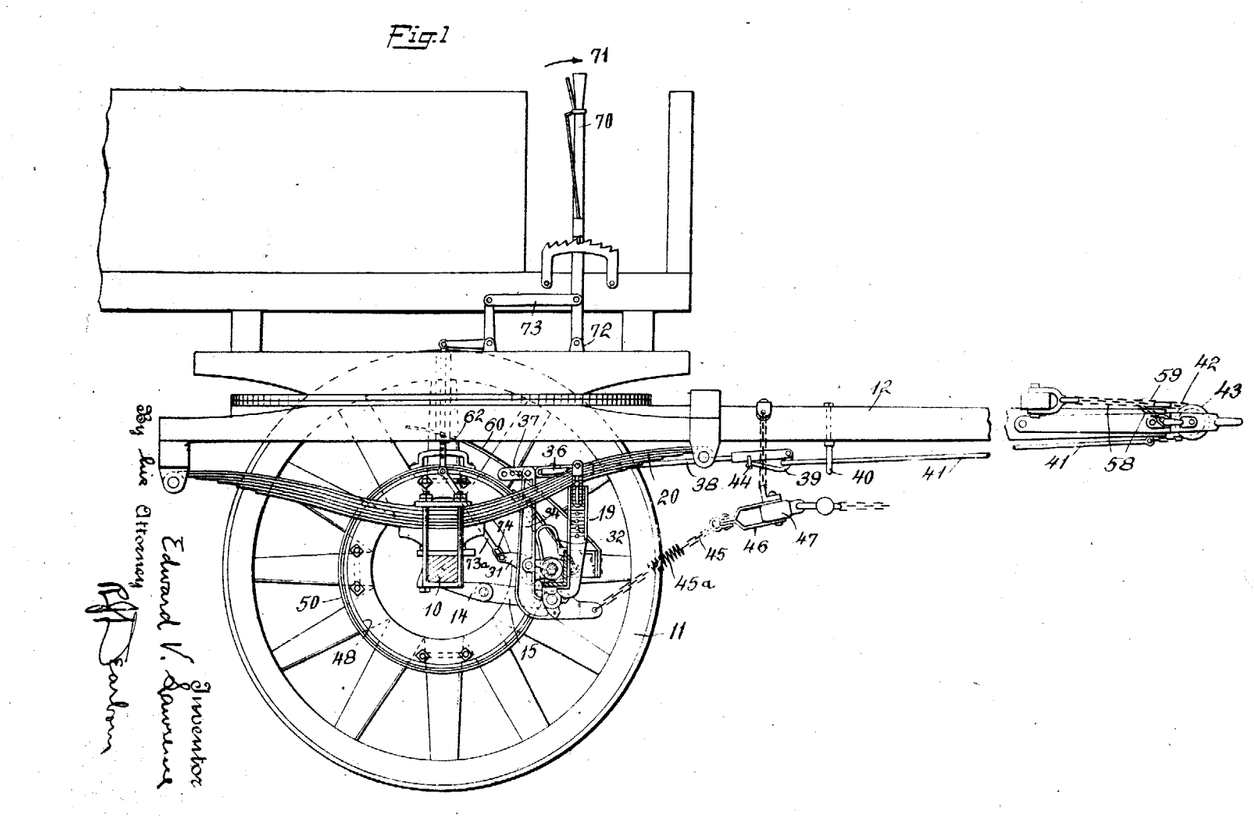
Figure 1 is a side elevation of the forward part of a wagon equipped with a brake which constitutes one embodiment of my invention. One of the wheels is removed and the axle shown in section to disclose the brake mechanism.
Figures 2, 3:
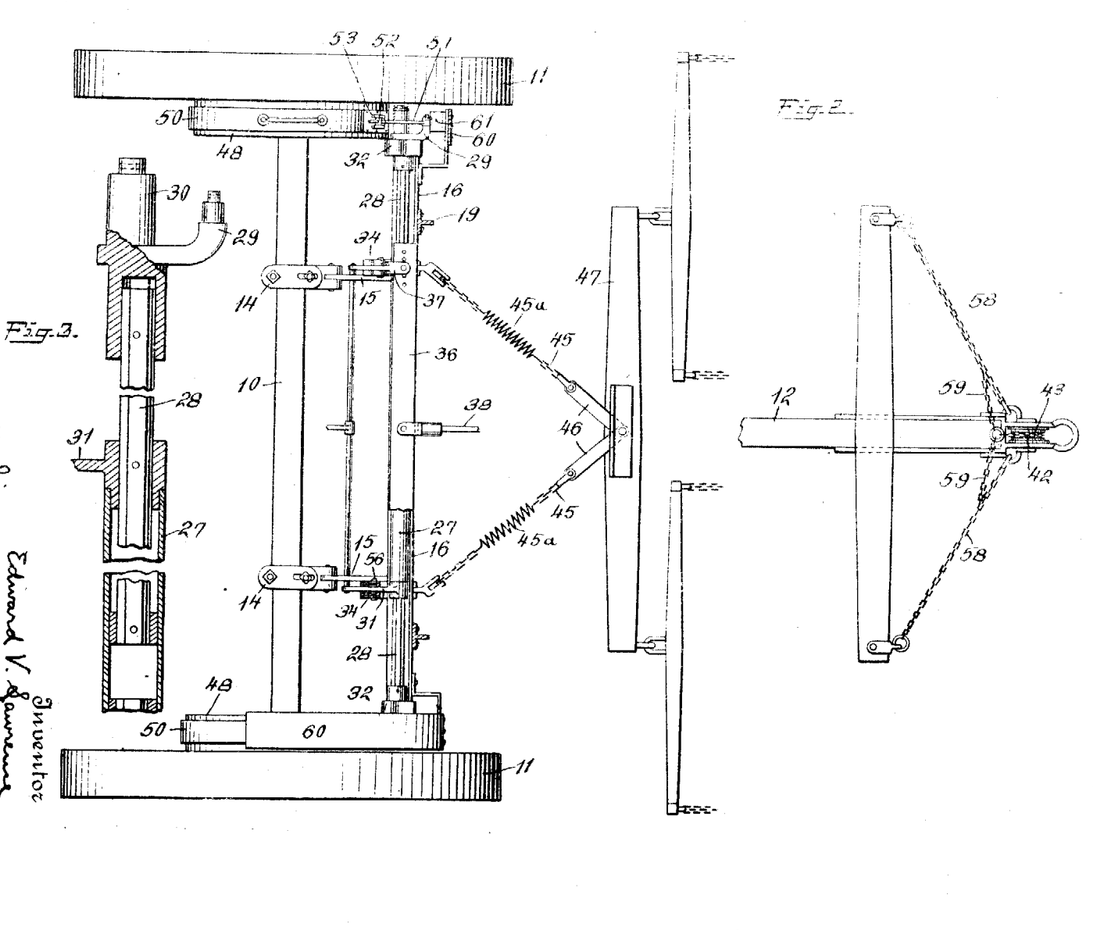
Figures 4, 5, 6, 7:
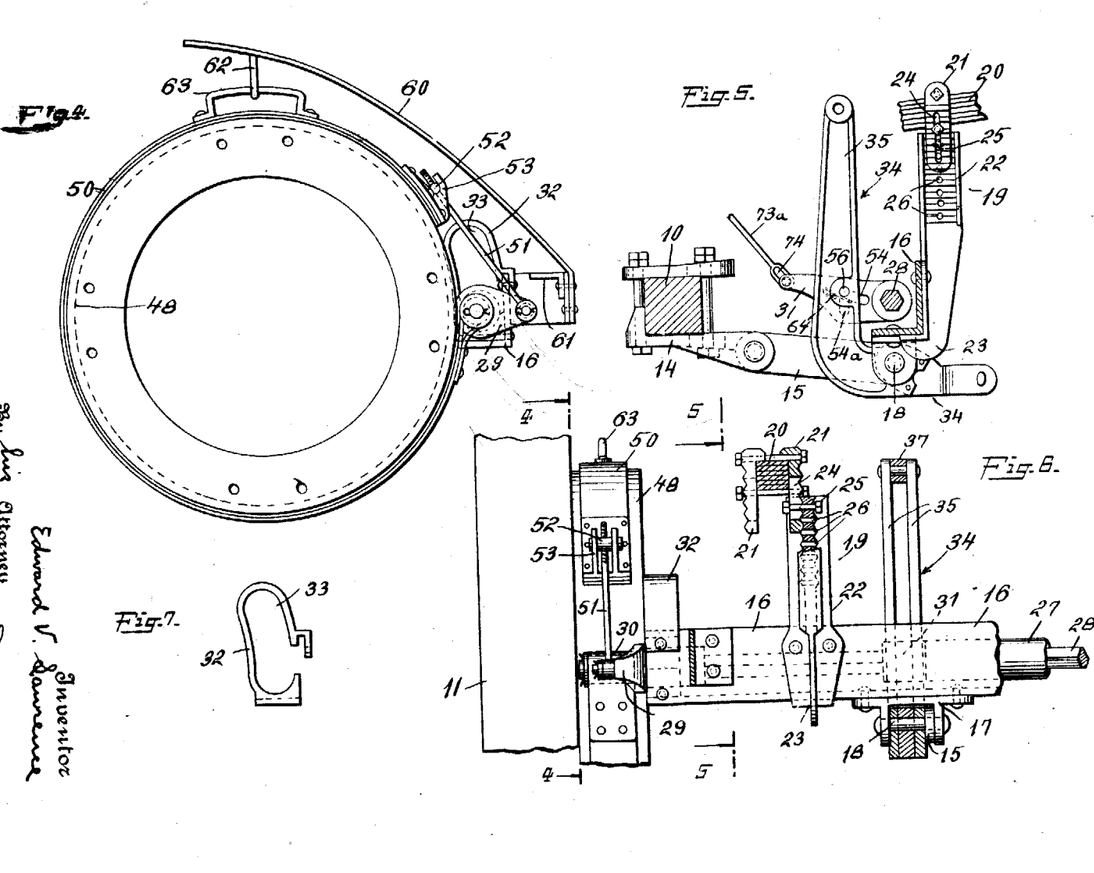

While any suitable clamp may be used, I prefer to employ the clamp illustrated in Figs. 1, 2 and 5. A transverse angle iron 16 which may be replaced by any suitable support, is substantially parallel to the axle 10 and has downwardly extending U-shaped brackets, in which pivot pins 18 are supported, the opposite ends of the links 15 being connected to the pins 18. The angle iron 16 is suspended by hangers 19 from some relatively fixed portion of the vehicle structure, such as for example, vehicle springs 20 as shown in Figs. 1, 5 and 6. Any suitable means, however, may be employed for supporting the angle iron in its proper position.

The hanger shown comprises a pair of clamping pieces 21, which are bolted or otherwise fastened to the spring 20, and a bracket 22 having a hooked end 23 at the bottom to engage and support the angle iron 16. The clamping pieces have toothed or notched outer surfaces, to coöperate with the notched web of the bracket and are provided with slots 24 to permit a bolt 25 to extend through one or both of them. The bracket has a plurality of holes 26 so that any one can be selected and the height of the angle iron 16 adjusted.

A tube or sleeve 27 is mounted on the angle iron 16 and forms a bearing for a pair of preferably hexagonal rocker shafts 28 which extend toward the center of the sleeve, and near their ends where they extend beyond the ends of the sleeve 27 they carry brake application levers. Each of these levers is composed of three sections 29—30 and 31, the sections 29 and 30 being integral in the arrangement illustrated and affixed to the end of the rocker shaft 28 adjacent to the brake to which they are connected. The section 31 is secured to the rocker shaft at the end of the sleeve 27 but may be integral with the sections 29 and 30, if desired. The rocker shafts and the sleeve are prevented from being displaced and are at the same time permitted a certain freedom of motion as and for the purpose hereinafter set forth, by means of stationary guide brackets 32, having curved slots 33 through which the rocker shafts extend. These brackets are preferably secured to the angle iron 16 near its respective ends. The sleeve 27 and the rocker shafts 28, together constitute an extensible structure which is adapted for application to wagons of different sizes.

Mounted on the pivot pins 18 by which the links 15 are connected to the brackets 17, is a pair of bell crank levers 34. Each of these levers is substantially L-shaped and is pivoted substantially in the center of the horizontal arm of the L as clearly shown in Figs. 1 and 5. The other arm of the L is made of two spaced members 35 which are attached to the horizontal arms, and extends upwardly to the rear of the angle iron 16 and the parts mounted thereon. A transverse equalizing bar 36 is connected by links 37 to the upper ends of the bell crank levers 34 as clearly shown in Figs. 1 and 2. This equalizing bar may be replaced by other means for accomplishing the same result or it may be omitted entirely.

A rod 38 extends forwardly under the wagon tongue 12 from the middle point of the equalizing bar 36 to which it is connected and has a hook 39 at its outer end. The tongue 12 is provided with suspension rings 40 in which a bar 41 is loosely mounted. This bar is provided with a ring or a link which is adapted to engage the hook 39 and at its forward end is connected to a chain 42 which extends around a sheave 43 rotatively mounted near the outer end of the tongue. The free end of this chain is connected to a collar yoke in a well known manner, the arrangement being such that when the animals are holding back the vehicle as it is pushing against them in going down hill or the like, they exert a pull on the chain 42 which is transmitted through the rod 41, the rod 38, the equalizing bar 36, and the links 37 to the levers 34. The hook 39 is composed of a hinged holding member which is normally held in the position shown in Fig. 1 by a small loop or clevis 44, but is arranged to be readily released to permit the tongue to be removed or to disconnect the rod 41 from the rod 38 for any cause.

The lower arms of the levers 34 are connected by chains 45 which preferably include springs 45ᵃ and links or shackles 46 to the middle point of an evener 47, the arrangement being such that when the horses pull forward the pull will be transmitted through the shackles 46 and the chains 45 to the lower arms of the lever 34.

As clearly shown in Fig. 5, the levers 34 do not serve directly to either set or release the brake which comprises drums 48 bolted to the spokes or otherwise affixed to the wheel, and brake bands 50 which are wrapped about the drums.

The sections 29 and 30 of each actuating lever are connected to the respective ends of the adjacent brake band. The connection between the upper end of the band and the lever section 29 is established by a link 51 which has a nut or adjustable head 52 at one end to engage a bifurcated hook 53 on the band.

The lever sections 31 extend between the parts of the lever 34 and are provided with cam slots 54. These slots are preferably formed with two branches as shown in Figs. 1 and 5 in order that the mechanism may be adapted to set the brake independently of the action of the team as hereinafter explained. The lower ends of the brake bands which are connected to the lever sections 30 are held relatively stationary and tend to pull the rocker shafts 28 downwardly thereby seating the shafts and the sleeve 27 in which they are mounted, firmly against the bottoms of the slots 33, in brackets 32 when the vehicle is moving forward and the brakes are applied.

Each of the levers 34 has a transverse pin 56 which extends through the cam slot 54 of the adjacent lever section 31. The action of the brake application levers having sections 29—30 and 31 and the bell crank lever 34, are therefore interdependent and the brake bands are set and released by the tilting of the levers 34, which results, as already described, from the forces exerted by the animals either in drawing the vehicle forward, or pushing back when it is going forward.

As already pointed out, the brake band when set, tends to firmly seat the rods 28 and the sleeve 27 on the brackets 32, but this is true only when the wheel and the brake drum are rotating in a direction corresponding to a forward movement of the vehicle. If the wheel is rotating in the opposite direction, as, for example, when the horses are backing the vehicle,—the action of the levers 34 will be the same as before and will tend to set the brakes, but the rotation of the wheel and the brake drums is now such as to carry the sleeve 27 and the rods 28, and their attached parts, upwardly within the slots 33 of the guide brackets 32 and to release the brake. Accordingly, the brake is automatically applied when needed but is released when the horses are attempting to back the vehicle.

The chain 42 after extending over the pulley 43 is connected as shown in Fig. 1 to the pole chains 58 by chains 59, the arrangement being such that there is slack in the pole chains near the pole and the force of the team in holding back is normally transmitted through the chains 59 and 42. The pole chains will, of course, act in the usual manner if the hook 30 is released or if the brake application mechanism is broken.

In order to lift the weight of the brake band from the drum to prevent excessive wear and unnecessary friction when the brake is released, I prefer to suspend the band as shown in Fig. 4 by means of a curved brace 60 which is secured to the angle iron 16 and has a stop 61 which is engaged by the lever arm 29 under certain conditions. The brace has a hanger loop or hook 62 which engages a loop or holder 63 on the band and preferably has the form of a wide plate so that it acts as a mud guard and also protects the brake mechanism from being struck by stones, bricks or other matter which may fall from the wagon load.

As above outlined, the lever arm 31 has the form shown in Figs. 1 and 5, the slot 54 being provided with a downwardly extending section 54ᵃ to permit the lever to be raised and set the brakes even when the horses are pulling the vehicle forward.

The transverse pin 56 is normally kept from falling into the section 54ᵃ of the slot by means of a spring 64. It will, of course, be understood that the pin 56 is in the opposite end of the slot when the brakes are applied by the holding back action of the team and consequently the spring is easily made sufficiently strong to release the brake when the team is pulling forward under normal conditions. If, however, as in going up a hill or in emergency cases it is desired to set the brake, a hand lever 70 may be thrown in the direction of the arrow 71 and in turning about its pivot 72 will actuate the brake application lever (having sections 29, 30 and 31) through links 73 and 73ᵃ.

There is a lost motion connection such as a pin and slot 74 between the link 73ᵃ and the lever arm 31 so that the lever may be actuated by the team independently of the hand-operated mechanism. Except for the stop 61, the brake could not be as effectively applied when the wheels were rotating backwardly or tending to rotate in a backward direction as when the load is standing on a hill. This stop is so located that it does not interfere with the operation of the brake under other conditions, but is engaged by the end of the lever section 29 when the lever section 31 is lifted by the application of the hand lever 70. The fulcrum of the brake application lever (having sections 29, 30 and 31) is thus shifted from the rocker shaft to the outer end of the section 29 and the upward pull on the lever section 31 transmitted through the link connection 73ᵃ wraps the brake band about the drum in the opposite direction from that in which it is wrapped when the brake is normally applied by the backing of the team.

Thus the brake band is wrapped in such a way that the turning of the wheel tends to assist in applying the brake for both directions of wheel rotation.

The operation of the complete mechanism will be understood from the description of the operation of the various parts as hereinbefore outlined, and will now be briefly discussed as follows:—Assuming that the parts occupy the positions in which they are illustrated in the drawings and that under these conditions the brake band is released from the drum, the vehicle may be drawn in the usual manner, without interference from the brakes. If, now, the horses proceed to draw the vehicle forward the pull exerted on the double tree 47 will be transmitted through the shackle 46 and the chains 45 to the lower ends of the levers. This pull will swing the levers slightly about their pivots 18 and will positively release the brake mechanism.

If it is now supposed that the vehicle starts to descend a grade with the horses holding back, the pull which they exert will be transmitted from the collar yoke (not shown) through the chains 58, 59 and 42, rod 41, rod 38, evener 36, and links 37, to the upper arms of the levers 34. This pull will swing the levers 34 in a clockwise direction as shown in the drawings, about the pivots 18 and in turn will tilt the brake application levers (having sections 29, 30 and 31) about their pivotal axes in such a manner as to put tension on the links 51 and set the brakes; the tighter the brakes are set with the wheels moving in a forward direction, the harder the sleeve 27 and the rocker shafts 28 will be pressed downwardly against the bottoms of the slots 33 in brackets 32. There is consequently no tendency for the parts to become displaced.

If the horses again exert a forward pull upon the vehicle, as for example, when the bottom of the grade is reached, the brake will be immediately and automatically released by the swinging of the levers 34 in the reverse direction.

The automatic setting of the brakes is, of course, not limited to down hill going and is particularly useful and valuable for stopping suddenly, as for example, when the team is pulled up suddenly at a cross street in the city,—not only does the brake increase the efficiency of the rig, but also acts in a most reliable manner as a safety device for the protection of foot passengers and other vehicles against accident.

If it is now assumed that the driver wishes to back the vehicle, when the horses push backwardly, they exert a pull through the neck yoke and chain 58 as before, to the levers 34, tending to move them in a clockwise direction. This tends to set the brakes but as soon as the bands engage the drums, even to a slight extent, the backward rotation of the wheels and the drums immediately lifts the sleeve 27 and the rods 28 upwardly so that the brake application levers (having sections 29, 30 and 31) are swung upwardly about the pins 56 as pivots, thereby releasing the brakes although the levers 34 may continue to occupy the positions which would set the brakes if the wheels were moving in a forward direction.

Figure 8:
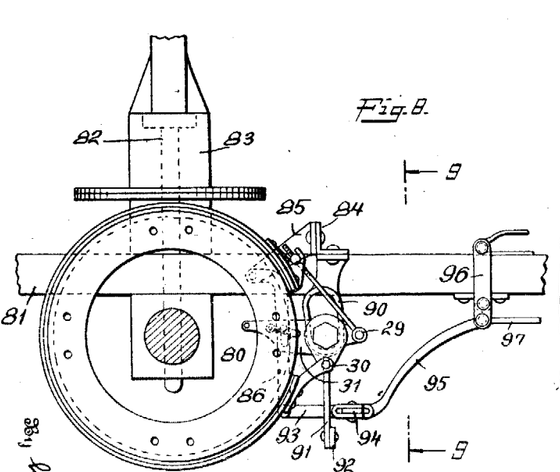
Figs. 8 and 9 are side and front elevations of a modified form of mechanism particularly adapted for application to a farm wagon.
Figure 9:
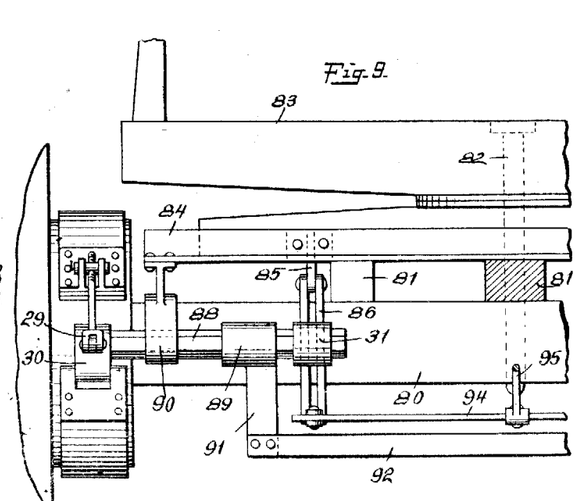

Having special reference to Figs. 8 and 9, 80 is the axle, 81 hounds or beams, 82 a king bolt and 83 a bolster of the vehicle. Mounted upon the hounds or beams 81, which form parts of the front swivel truck of the vehicle, is a supporting bar 84 which may have the form of an angle iron as shown, and which corresponds to the support 16 of the previous figures. This bar has rearwardly extending arms 85 near its respective ends, as shown in Fig. 8, to which levers 86 are secured and extend downwardly therefrom. These levers correspond to levers 34 of Fig. 1 and are adapted to tilt the brake application levers (having sections 29, 30 and 31) and to actuate the band brakes.

The lever sections are secured to rocker shafts 88 which are rotatively mounted in supporting bearings 89 as shown in Fig. 9. Each of these shafts extends through a guide bracket 90 which corresponds to the bracket 32 but extends downwardly from the supporting rod 54 instead of upwardly as shown in the previous figures. The bearings 89 are formed in the offset end brackets 91 of a transverse rod or bar 92 which extends below the hounds 81 and also avoids interference with any other part of the vehicle.

The levers 86 are joined at their lower ends by rigid links 93 to an equalizing bar 94, the middle point of which is connected by a link 95 to the lower end of a lever 96. The evener of the vehicle is connected to the upper end of this lever and a rod 97 which corresponds to the rod 41 is connected to its lower end. The arrangement of parts is such that when the vehicle is held back by the horse when the wheels are turning forward, as in going down hill, or stopping a load, the lever 96 will be pulled forwardly at the bottom of the rod 97 and will transmit motion through link 95, the equalizer 94 and the links 93 to the lever 86. These levers when thus actuated will turn the brake actuating lever sections 29, 30 and 31 about the shaft 88 as a pivot and will set the brake in a manner corresponding to that of the brake already described in connection with the previous figures. When the team is pulling forward on the vehicle the top of the lever 96 is pulled forward and the brakes are automatically released, the evener being connected to the upper end of the lever 96 as above indicated.

Figure 10:
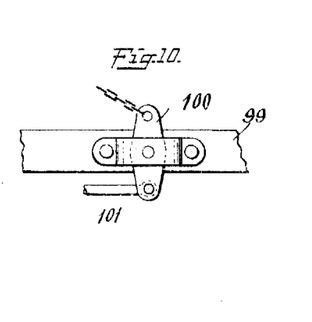
Fig. 10 shows an arrangement of levers which is applicable to a two-wheeled one-horse cart, for example, and Fig. 11 one that is applicable to an ordinary one-horse wagon.

In a one horse vehicle, if the shafts 99 are constructed as a part of the body as in some dump wagons, a lever such as 100 shown in Fig. 10, is mounted on each of the shafts and is connected at its upper end to the harness breeching and at its lower end by any suitable connector such as a link 101 to the lever 86.

If the shafts 110 are mounted in the usual brackets 111 (see Fig. 11) levers 112 may replace the shafts in the brackets and be connected at their lower ends by links 113 to the brake levers 86, the shafts being pivotally connected to the levers 112 at their upper ends. The levers 100 and 112 correspond to lever 96.

The levers 34 are intended as a suitable means for actuating the brake application lever (having sections 29, 30 and 31) and some other suitable means may, of course, be employed to establish the connection to the brake application lever, but I consider the arrangement illustrated to be preferable.

I have for convenience used the word "team" to designate either one or more horses or animals which may be utilized to draw a wagon.

My invention is not limited to horse-drawn vehicles and it is well adapted for use with trailers or like vehicles which are drawn by a forward tractor or motor vehicle.

Figures 11, 12:
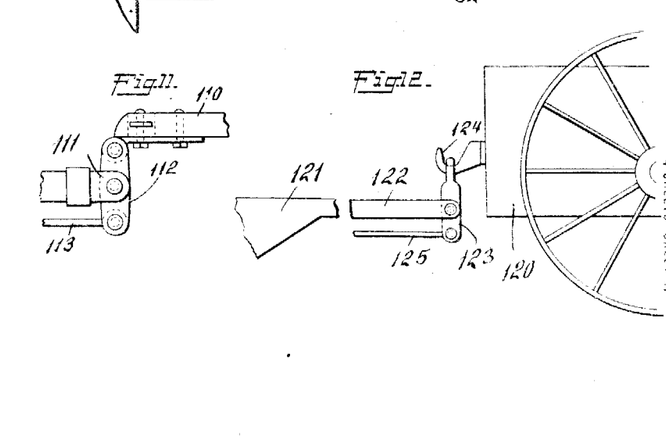

In this connection attention is directed to Fig. 12, in which 120 designates a tractor vehicle which may be a motor truck, or a horse-drawn leading vehicle to which a trailer 121 is coupled. The trailer may have a pole, tongue or projection 122 on which a lever 123 is pivoted. The upper end of this lever is hooked onto or otherwise attached to a hook or tail projection 124 of the tractor and a brake application rod 125 is connected to its lower end as is shown in the drawing.

This application is a continuation in part of my copending application S. No. 9504 filed February 20, 1915, and has been substituted therefor.

Various structural modifications may be effected within the spirit and scope of my invention, and I intend that only such limitations be imposed as are indicated in the appended claims.

What I claim is:

1. A wagon brake mechanism comprising a band brake having a drum secured to the wagon wheel, an actuating lever for applying the brake, having a movable fulcrum, means dependent upon the tractive force for automatically setting the brake when the wagon is moving forward and pushing against the tractive force, said movable fulcrum being adapted to be displaced when the wagon is moving backwardly to prevent the setting of the brake when the wagon is being backed.

2. A wagon brake mechanism comprising a band brake having a drum secured to the wagon wheel, an actuating lever for applying the brake having a movable fulcrum, and a lever having a stationary fulcrum operatively connected to the brake actuating lever and dependent for its action upon the tractive force.

3. A wagon attachment comprising a band brake having a drum adapted to be secured to the wagon wheel, an actuating lever for applying the brake having a movable fulcrum, a lever having a stationary fulcrum operatively connected to the brake actuating lever and adapted to be tilted by the team when holding back, the movable fulcrum of said brake actuating lever being adapted to be displaced by the backward turning of the wagon wheel to release the brake independently of said stationary fulcrum lever.

4. A wagon attachment comprising a band brake, an actuating lever for applying the brake, a second lever having a stationary fulcrum operatively connected to the brake actuating lever and dependent for its action upon the team, and means for automatically releasing the brake band to permit the backing of the wagon.

5. A wagon attachment comprising a brake, an actuating lever for applying the brake having a movable fulcrum, and means for setting the brake when the wagon is moving forward, said movable fulcrum being adapted to be displaced when the wagon is moving backwardly to render said means inoperative.

6. In combination with a band brake, an actuating lever for applying the brake having a movable fulcrum, means for tilting the actuating lever to apply the brake, said movable fulcrum being adapted to be displaced when the band brake drum is rotating in one direction to prevent the setting of the brake.

7. A wagon attachment comprising band brakes having drums adapted to be secured to a pair of wagon wheels, actuating levers for applying the respective brakes, an equalizing bar connecting the last named levers at one end, means dependent upon the team for exerting a pull upon the equalizing bar when the team is holding back, and means for automatically releasing the brake when the team is backing the wagon.

8. A wagon attachment comprising band brakes having drums adapted to be secured to a pair of wagon wheels, actuating levers for applying the respective brakes, an equalizing bar connecting the last named levers at one end, means dependent upon the team for exerting a pull upon the equalizing bar when the team is holding back, and a draft mechanism connected to the opposite end of said levers for releasing the brakes when the team pulls forward.

9. A wagon attachment comprising band brakes having drums adapted to be secured to a pair of wagon wheels, actuating levers for applying the respective brakes, an equalizing bar connecting the last named levers at one end, means dependent upon the team for exerting a pull upon the equalizing bar when the team is holding back, draft mechanism comprising a double tree, oblique yielding connections from the center of the double tree to the opposite ends of said levers, whereby the forward pull of the horses will release the brakes.

10. A wagon attachment comprising band brakes having drums adapted to be secured to a pair of wagon wheels, actuating levers for applying the brakes having movable fulcrums, levers pivotally supported adjacent to the first-named levers and operatively connected thereto having stationary fulcrums, means connected to the stationary fulcrum levers at one end for applying brakes when the team holds back, said movable fulcrums being adapted to be displaced when the wheel and brake drums turn backwardly to prevent the setting of the brakes when the team is backing the wagon.

11. A wagon attachment comprising band brakes having drums adapted to be secured to a pair of wagon wheels, actuating levers for applying the brakes having movable fulcrums, levers pivotally supported adjacent to the first-named levers and operatively connected thereto having stationary fulcrums, means connected to the stationary fulcrum levers at one end for applying brakes when the team holds back, and a draft mechanism connected to the levers at their opposite ends for releasing the brake when the team is pulling forward, said movable fulcrums being adapted to be displaced when the wheel and brake drums turn backwardly to prevent the setting of the brakes when the team is backing the wagon.

12. A wagon attachment comprising band brakes having drums adapted to be secured to a pair of wagon wheels, actuating levers for applying the brakes having movable fulcrums, levers pivotally supported adjacent to the first-named levers and operatively connected thereto having stationary fulcrums, means connected to the stationary fulcrum levers at one end for applying brakes when the team holds back, and a draft mechanism comprising an evener, chains connected to the double tree at its middle point and extending obliquely to the stationary fulcrum levers to release the brake when the team is pulling forward.

13. A wagon attachment comprising band brakes having drums adapted to be secured to a pair of wagon wheels, actuating levers for applying the brakes having movable fulcrums, levers pivotally supported adjacent to the first-named levers and operatively connected thereto having stationary fulcrums, means connected to the stationary fulcrum levers at one end for applying brakes when the team holds back, and a draft mechanism comprising an evener, chains connected to the double tree at its middle point and extending obliquely to the stationary fulcrum levers to release the brake when the team is pulling forward, said movable fulcrums being adapted to be displaced when the wheel and brake drums turn backwardly to prevent the setting of the brakes when the team is backing the wagon.

14. A wagon attachment comprising a transverse supporting bar, a pair of independent pivot shafts mounted thereon near the respective ends thereof, brake members, brake actuating levers mounted to tilt on the axes of the respective pivot shafts, bell crank levers pivotally suspended from the supporting bar, and means for connecting the bell crank levers to be oppositely influenced by the pulling forward and holding back of a team harnessed into the wagon, and an operative connection between the bell crank levers and the brake actuating levers dependent upon the direction of wagon wheel rotation for its brake setting effectiveness.

15. A wagon attachment comprising a pair of tiltable levers, means dependent upon the pulling forward and holding back action of the team for turning the levers in opposite directions on their pivots, brakes, brake actuating levers operatively connected to the pivotal levers and having movable pivots adapted to occupy brake setting and brake releasing position when the team is holding back, depending upon the direction of the wagon wheel rotation.

16. A wagon attachment comprising a transverse supporting bar, a pair of bell crank levers tiltably suspended from the supporting bar near its ends, brake drums secured to the wagon wheels, brake bands surrounding the drum, brake actuating levers mounted to tilt on movable pivot shafts supported by the bar, and means for connecting the bell crank levers to be tilted in one direction or the other according as the vehicle is being drawn forward or pushed back by the team.

17. A brake mechanism comprising a drum, a band coöperating with the surface of the drum, a brake actuating lever supported on a movable pivot, a guide bracket for limiting the motion of said movable pivot, a bell crank lever tiltably supported on a stationary pivot, and a lost motion connection between the bell crank lever and the brake actuating lever, whereby a movement of the bell crank lever in one direction releases the brake and the motion of the bell crank lever in the opposite direction sets the brake only in one direction of drum rotation.

18. A wagon attachment comprising a pair of band brakes having drums adapted to be secured to a pair of wagon wheels, a transverse supporting bar adjacent to the drums, guide brackets secured to said bar, an extendible shaft comprising a sleeve, a pair of pivot shafts extending into said sleeve and mounted on said supporting bar in said guide brackets, brake actuating levers affixed to said shafts, connected to the brake bands at one end and having cam slots at the other end, a pair of bell crank levers pivotally mounted on said supporting bar adjacent to the brake actuating levers and having pins extending laterally into the cam slots thereof, an equalizing bar connected to said bell crank levers at their upper ends, and means connected to the equalizing bar for exerting a pull on the bar and on the bell crank levers when the team is holding back the wagon, draft mechanism comprising a double tree, a pair of chains connected to the double tree at its middle point and extending obliquely to the opposite ends of the bell crank levers whereby a forward pull of the team releases the levers, said pivotal shafts being adapted to move circumferentially in said guide brackets when the wagon wheels and brake drums are moving backwardly, to prevent the setting of the brakes when the team is backing the wagon.

19. A wagon attachment comprising a band brake having a drum adapted to be secured to a wagon wheel, a transverse support, a guide bracket thereon, a pivot shaft mounted on the support in the guide brackets, a brake actuating lever affixed to said shaft connected to the brake band at one end and having a cam slot at the other end, a bell crank lever pivotally mounted on said support adjacent to the brake actuating lever and having a pin extending laterally into the cam slot thereof, means for exerting a pull on the bell crank lever when the team is holding back the wagon, draft mechanism connected to the opposite end of the bell crank lever whereby a forward pull of the team releases the lever, said pivotal shaft being adapted to move circumferentially relative to the brake drum in said guide bracket when the wagon wheel and brake drum are moving backwardly to prevent setting of the brake when the team is backing the wagon.

20. A wagon attachment comprising a band brake having a drum adapted to be secured to a wagon wheel, a transverse support, a guide bracket thereon, a pivot shaft mounted on the support in the guide bracket, a brake actuating lever affixed to said shaft connected to the brake band at one end and having a cam slot at the other end, a bell crank lever pivotally mounted on said support adjacent to the brake actuating lever and having a pin extending laterally into the cam slot thereof, and means for exerting a pull on the bell crank lever when the team is holding back the wagon.

21. A wagon attachment comprising a pair of band brakes having drums adapted to be secured to a pair of wagon wheels, a transverse supporting bar adjacent to the drums, guide brackets secured to said bar, an extendible shaft comprising a sleeve, a pair of pivot shafts extending into said sleeve and mounted on said supporting bar in said guide brackets, brake actuating levers affixed to said shafts, connected to the brake bands at one end and having cam slots at the other end, a pair of bell crank levers pivotally mounted on said supporting bar adjacent to the brake actuating levers and having pins extending laterally into the cam slots thereof, an equalizing bar connected to said bell crank levers at their upper ends, and means connected to the equalizing bar for exerting a pull on the bar and on the bell crank levers when the team is holding back the wagon.

22. A wagon attachment comprising a pair of band brakes having drums adapted to be secured to a pair of wagon wheels, a transverse supporting bar adjacent to the drums, guide brackets secured to said bar, an extendible shaft comprising a sleeve, a pair of pivot shafts extending into said sleeve and mounted on said supporting bar in said guide brackets, brake actuating levers affixed to said shafts, connected to the brake bands, a pair of levers pivotally mounted on said supporting bar adjacent to the brake actuating levers, and operatively connected thereto, an equalizing bar connected to said levers, means connected to the equalizing bar for exerting a pull on the bar and on the levers when the team is holding back the wagon, and draft mechanism comprising a double tree, a pair of flexible connectors joined to the double tree at its middle point and extending obliquely to the opposite ends of the levers whereby a forward pull of the team releases the levers, said pivotal shafts being adapted to move circumferentially in said guide brackets when the wagon wheels and brake drums are moving backwardly, to prevent the setting of the brakes when the team is backing the wagon.

23. A wagon attachment comprising a pair of band brakes having drums adapted to be secured to a pair of wagon wheels, a transverse supporting bar adjacent to the drums, guide brackets secured to said bar, an extendible shaft comprising a sleeve, a pair of pivot shafts extending into said sleeve and mounted on said supporting bar in said guide brackets, brake actuating levers affixed to said shafts, connected to the brake bands, a pair of levers pivotally mounted on said supporting bar adjacent to the brake actuating levers and operatively connected thereto, an equalizing bar connected to said levers, means connected to the equalizing bar for exerting a pull on the bar and on the levers when the team is holding back the wagon, draft mechanism connected to the opposite ends of the levers whereby a forward pull of the team releases the levers, said pivotal shafts being adapted to move circumferentially in said guide brackets when the wagon wheels and brake drums are moving backwardly, to prevent the setting of the brakes when the team is backing the wagon.

24. A wagon attachment comprising a pair of band brakes having drums adapted to be secured to a pair of wagon wheels, a transverse supporting bar adjacent to the drums, guide brackets secured to said bar, an extendible shaft comprising a sleeve, a pair of pivot shafts extending into said sleeve and mounted on said supporting bar in said guide brackets, brake actuating levers affixed to said shafts, connected to the brake bands, a pair of levers pivotally mounted on said supporting bar adjacent to the brake actuating levers and operatively connected thereto, an equalizing bar connected to said levers, and means connected to the equalizing bar for exerting a pull on the bar and on the levers when the team is holding back the wagon.

25. A wagon brake mechanism comprising a band brake, means for setting the brake and a lever adapted to be tilted in one direction or the other dependent upon the team and operatively connected to the brake setting means, said means being adapted to be actuated independently of the lever, and means for automatically releasing the brake to permit the backing of the wagon.

26. A wagon brake mechanism comprising a band brake, means for setting the brake and a lever adapted to be tilted in one direction or the other dependent upon the team and operatively connected to the brake setting means, and hand operated means for actuating the brake setting means, said brake setting means being capable of movement independent of the lever, and means dependent upon the backward movement of the wagon for releasing the brake.

27. A brake comprising a drum, a band, a brake application lever affixed to a movable rocker shaft, said band being connected at its respective ends to the rocker shaft and to one end of the lever, means for turning the lever about the center of the rocker shaft as an axis to apply the brake when the drum is rotating in one direction and means for displacing the rocker shaft and turning the lever about its end as an axis to oppositely wrap the band about the drum and apply the brake when the drum is rotating in the opposite direction.

28. A brake comprising a drum, a band, a brake application lever connected to the respective ends of the band at spaced points in its length, means for turning the lever about one of said points as a pivot for setting the brake in one direction of drum rotation, a stop, and means for shifting the lever to engage the stop whereby it is adapted to be turned about the other point as a pivot and set the brake for the opposite direction of drum rotation.

29. A wagon brake mechanism comprising a band brake, an actuating lever connected to the brake band at two points materially spaced apart, means dependent upon the backing of the team for turning the lever about one of said points as a pivot to set the brake for one direction of drum rotation, said lever being adapted to be displaced to prevent the setting of the brake when the team is backing the vehicle, and means independent of the team for swinging the lever about the other point as a pivot to set the brake for the opposite direction of drum rotation.

30. A wagon brake mechanism comprising a band brake, an actuating lever connected to the brake band at two points materially spaced apart, means dependent upon the backing of the team for turning the lever about one of said points as a pivot to set the brake for one direction of drum rotation, said lever being adapted to be displaced to prevent the setting of the brake when the team is backing the vehicle, a stop and means independent of the team for displacing the lever so that it engages the stop and is adapted to be swung about the stop as a pivot for setting the brake when the drum is rotating in a backward direction.

31. A wagon brake mechanism comprising a band brake, an actuating lever connected to the brake band at two points materially spaced apart, means dependent upon the backing of the team for turning the lever about one of said points as a pivot to set the brake for one direction of drum rotation, said lever being adapted to be displaced to prevent the setting of the brake when the team is backing the vehicle, a stop, and hand operated means for displacing the lever to engage the stop and to swing the lever about the stop as a pivot to wrap the band about the drum in the opposite direction of rotation.

32. A wagon brake mechanism comprising a band brake, an actuating lever for applying the brake having a movable fulcrum and connected at spaced points in its length to the respective ends of the bands, a second lever having a stationary fulcrum operatively connected to the brake actuating lever and dependent for its action upon the team, the fulcrum of said actuating lever being adapted to be displaced automatically to prevent the setting of the brake when the team is backing the vehicle, a stop, and means independent of the team for adjusting the lever to engage the stop and to swing the lever about the stop as a pivot whereby the brake may be set when the vehicle is moving backwardly.

33. A wagon brake mechanism comprising a band brake, an actuating lever for applying the brake having a movable fulcrum and connected at spaced points in its length to the respective ends of the bands, a second lever having a stationary fulcrum operatively connected to the brake actuating lever and dependent for its action upon the team, the fulcrum of said actuating lever being adapted to be displaced automatically to prevent the setting of the brake when the team is backing the vehicle, a stationary stop and a hand lever connected to the actuating lever by a lost motion connection for adjusting said lever to engage the stop and for swinging the lever about the stop as a pivot independent of the team to set the brake when the wagon is moving backwardly.

34. A wagon attachment comprising a band brake having a drum adapted to be removably secured to the wagon wheel, an actuating lever for applying the brake, having a movable fulcrum, means dependent upon the team for automatically setting the brake when the wagon is moving forward and the team is holding back, said movable fulcrum being adapted to be displaced when the wagon is moving backwardly to prevent the setting of the brake when the team is backing the wagon.

35. A wagon attachment comprising a band brake having a drum adapted to be secured to the wagon wheel, an actuating lever for applying the brake having a movable fulcrum, a lever having a stationary fulcrum operatively connected to the brake actuating lever and dependent for its action upon the team.

36. Wagon brake mechanism comprising a brake drum rigidly secured to a wagon wheel, a brake member adapted to coöperate therewith, means for setting the brake, and a lever adapted to be tilted in one direction or the other, dependent upon the tractive force, and operatively connected to the brake setting means, said means being adapted to be rendered inoperative by a backward movement of the wagon.

In witness whereof, I have hereunto set my hand this 12th day of July, 1916.

EDWARD V. LAWRENCE.